US008356355B2

(12) United States Patent
Holzapfel et al.

(10) Patent No.: US 8,356,355 B2
(45) Date of Patent: Jan. 15, 2013

(54) DVD COPY PROTECTION

(75) Inventors: Klaus Holzapfel, Kuchl (AT); Walter Hinterhoelzl, Groedig (AT); Guenther Kattner, Hallein (AT); Peter Meerwald, Salzburg (AT)

(73) Assignee: SONY DADC Austria AG, Anif (AT)

( * ) Notice: Subject to any disclaimer, the term of this patent is extended or adjusted under 35 U.S.C. 154(b) by 1088 days.

(21) Appl. No.: 10/577,928

(22) PCT Filed: Jun. 9, 2004

(86) PCT No.: PCT/EP2004/006268
§ 371 (c)(1),
(2), (4) Date: May 1, 2006

(87) PCT Pub. No.: WO2005/050638
PCT Pub. Date: Jun. 2, 2005

(65) Prior Publication Data
US 2007/0036356 A1 Feb. 15, 2007

(30) Foreign Application Priority Data
Oct. 31, 2003 (EP) .................................... 03024894

(51) Int. Cl.
*G06F 21/00* (2006.01)
(52) U.S. Cl. ................ 726/26; 726/31; 726/32; 726/33; 380/201; 713/166; 713/167; 713/193
(58) Field of Classification Search .................... 726/26; 380/201
See application file for complete search history.

(56) References Cited

U.S. PATENT DOCUMENTS

| 5,870,523 | A | * | 2/1999 | Kikuchi et al. | 386/241 |
|---|---|---|---|---|---|
| 5,999,698 | A | * | 12/1999 | Nakai et al. | 386/230 |
| 6,118,927 | A | * | 9/2000 | Kikuchi et al. | 386/241 |
| 6,341,196 | B1 | * | 1/2002 | Ando et al. | 386/248 |
| 6,798,976 | B2 | * | 9/2004 | Tsumagari et al. | 386/241 |

(Continued)

FOREIGN PATENT DOCUMENTS

CN 1365495 A 8/2002

(Continued)

OTHER PUBLICATIONS

Kahng, Andrew B.; Kirovski, Darko; Mantik, Stefanus; Potkonjak, Miodrag; Wong, Jennifer L. "Copy Detection for Intellectual Property Protection of VLSI Designs". International Conference on Computer-Aided Design. Pub: 1999. Relevant pp. 600-604. Found on the World Wide Web at: http://ieeexplore.ieee.org/stamp/stamp.jsp?tp=&arnumber=810718.*

(Continued)

*Primary Examiner* — Nathan Flynn
*Assistant Examiner* — Jeremiah Avery
(74) *Attorney, Agent, or Firm* — Oblon, Spivak, McClelland, Maier & Neustadt, L.L.P.

(57) ABSTRACT

A record carrier for storing at least one stream of linked content cells thereon, which linking is performed based on navigation data. The record carrier includes modified navigation data and/or a stream arrangement of at least one stream of linked content cells, so that an access of the at least one stream of linked content cells on the record carrier under consideration of the navigation data is not disturbed, whereas a generally linear access of the at least one stream of linked content cells on the record carrier is disturbed.

41 Claims, 5 Drawing Sheets

U.S. PATENT DOCUMENTS

| | | | |
|---|---|---|---|
| 6,842,862 B2 * | 1/2005 | Chow et al. | 713/190 |
| 7,058,819 B2 * | 6/2006 | Okaue | 713/193 |
| 7,079,754 B2 * | 7/2006 | Kikuchi et al. | 386/241 |
| 7,486,790 B1 * | 2/2009 | Selinfreund et al. | 380/201 |
| 2002/0159591 A1 | 10/2002 | Heylen et al. | |
| 2004/0003270 A1 * | 1/2004 | Bourne et al. | 713/193 |
| 2004/0187161 A1 * | 9/2004 | Cao | 725/110 |
| 2005/0185926 A1 | 8/2005 | Basile et al. | |
| 2006/0182418 A1 * | 8/2006 | Yamagata et al. | 386/95 |

FOREIGN PATENT DOCUMENTS

| | | |
|---|---|---|
| EP | 0 724 264 | 7/1996 |
| JP | 8-273304 | 10/1996 |
| JP | 10-074379 | 3/1998 |
| JP | 2001-155425 | 6/2001 |
| JP | 2001-351321 | 12/2001 |
| JP | 2002-93058 | 3/2002 |
| JP | 2002-190183 | 7/2002 |
| JP | 2003-6981 | 1/2003 |
| JP | 2003-178461 | 6/2003 |
| JP | 2003-178536 | 6/2003 |
| JP | 2003-187459 | 7/2003 |
| JP | 2003-243993 | 8/2003 |
| WO | WO 01/61695 A1 | 8/2001 |
| WO | WO 02/073617 A1 | 9/2002 |
| WO | WO 03/034424 A2 | 4/2003 |
| WO | WO 03/088241 A2 | 10/2003 |

OTHER PUBLICATIONS

Office Action issued Feb. 1, 2011 in Japan Application No. 2006-537072 (With English Translation).

Office Action issued Mar. 1, 2011 in Chinese Patent Application No. 200480031560.8 (English translation only).

U.S. Appl. No. 13/371,952, filed Feb. 13, 2012, Holzapfel, et al.

Office Action Issued Dec. 13, 2011, in Chinese Patent Application No. 200480031560.8 with English translation.

Chinese Office Action issued Jan. 31, 2012, in China Patent Application No. 201110029914.7 (with English Translation).

* cited by examiner

Figure 3:
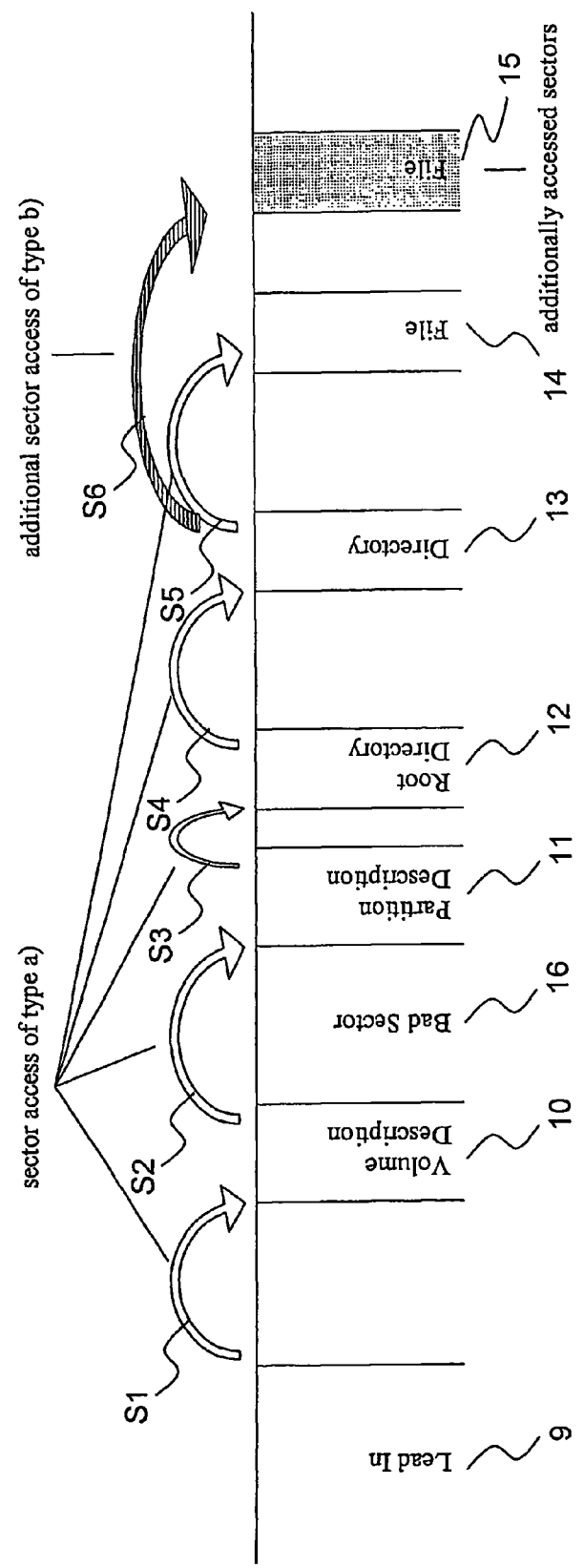

Fig. 3  File system sector access

ECC block configuration

Data sector configuration

DVD COPY PROTECTION

The present invention relates to a method that prevents the copying of content stored on record carriers or storage media and/or makes copying more difficult. Further, the present invention relates to corresponding record carriers protected with this method. In particular, the present invention relates to optical media conforming to the DVD video specification, but is not limited thereto.

To protect the rights of the owners of the copy rights many specifications for storage media includes copy protection mechanisms. For DVD video discs generally three mechanisms are used:

Analog CPS: This method is designed to decrease the quality of DVD video content when copied to an analog video tape medium.

CGMS: The serial copy management system (CGMS) is designed to prevent initial copies or generational copies (copies of copies). This method embeds copy control information in the storage media and in the outgoing video signal. The recording device is responsible to respect this information and refuse copying when required.

CSS: The content scrambling system (CSS) is a data encryption and authentication scheme. The content stored on DVD video media is encrypted and the decryption key is in the lead-in region of the disc. DVD-ROM drives have to allow access to this data only after a successful authentication procedure.

Since the use of analog video tapes is regressive the Analog CPS system is losing its importance. The most important threat for the copy rights of DVD video content is the widespread availability of personal computer systems.

In October 1999 a group of crackers reverse-engineered the CSS system and software to decrypt CSS protected content was distributed over the internet. Based on this software a large number of software applications were built to copy DVD video content on computer hard disc drives, and/or copy DVD video content to recordable media.

The use of these software applications is very simple and creates an identical or high quality copy of the original content. Since no special skill is required this software applications are very popular and are widely used. The wide use of this software causes a significant reduction of sold DVD video media and consequently an enormous financial harm to the owner of the copy rights.

In many cases a copy of the whole data on the media (one-to-one copy) is not possible since the target media does not have the same data capacity. For example most DVD video discs are so called DVD9 discs with a data capacity of about 9 GB. Available recordable DVD media (DVD-R, DVD-RW, DVD+R, DVD+RW, DVD-RAM) do have a maximum data capacity of about 4.5 GB. The data capacity of CD recordable media is far less. Therefore the DVD video copy software has to reduce the amount of data. This can be done by extracting parts of the content, and/or a higher compression of the content.

DVD video copy software usually supports both ways to reduce the data.

Therefore, it is the object underlying the present invention to provide a record carrier that shows improved copy protection characteristics and an improved method to provide a copy protection for a record carrier, in particular for a record carrier according to the DVD format or a comparable format. A comparable format according to the present invention is in particular a format according to which at least one stream of linked content cells is stored on the record carrier.

This object is solved by a record carrier for storing at least one stream of linked content cells thereon as defined in independent claim 1 and a method to provide a copy protection for a record carrier for storing at least one stream of linked content cells thereon as defined in independent claim 9. Respective preferred embodiments thereof are respectively defined in the respective following sub-claims. A method to copy a record carrier according to the present invention is defined in independent claim 17. A preferred embodiment thereof is defined in claim 18. A computer program product according to the present invention is defined in claim 19 and a computer readable storage means is defined in claim 20.

Therefore, a record carrier for storing at least one stream of linked content cells thereon, which linking is performed based on navigation data, according to the present invention comprises modified navigation data and/or a stream arrangement of at least one stream of linked content cells, so that an access of the record carrier under consideration of the navigation data is not disturbed, whereas a generally linear access of the record carrier is disturbed.

Correspondingly, the method to provide a copy protection for a record carrier for storing at least one stream of linked content cells thereon, which linking is performed based on navigation data, according to the present invention comprises the step(s) of modifying navigation data and/or setting a stream arrangement of at least one stream of linked content cells, so that an access of the record carrier under consideration of the navigation data is not disturbed, whereas a generally linear access of the record carrier is disturbed.

Further correspondingly, the method to copy a record carrier for storing at least one stream of linked content cells thereon, which linking is performed based on navigation data, according to the present invention comprises the step of accessing of the record carrier under consideration of the navigation data.

An access of the record carrier according to the present invention is in particular an access of the at least one stream of linked content cells on the record carrier, but is not limited to this possibility, but may e.g. also be an access of file system structures and/or file content used to locate the linked content cells, as will be set-out below.

There is a significant difference in the way a common playback device (or playback software) uses the properties of linked content cells, e.g. the DVD video data, and usual copy software for such linked content cells, e.g. DVD video copy software, uses these properties. These properties are here summarized under the term navigation data which means not only data used to navigate between different streams, but also data that is used to set-up a respective stream, to define its beginning and end, to branch a stream, to unify two streams, etc.

1) A playback device (or playback software) that is dedicated to the particular type of record carrier renders the presentation data according to the current player status and user actions (e.g. remote control commands). Due to the usual interactive capabilities of such record carriers that store at least one stream of linked content cells thereon, e.g. DVD video media with multiple languages, the data access is more non-linear.

2) Copy software is designed to copy the requested content. It usually has a simplified player status model and can ignore parts of the navigation data. The data access is more linear. It can be a desired behavior of this software to copy without interpreting the navigation data, in particular, the copy software aims for a 1:1 copy of the navigation data so that the copied disc includes the whole navigation functionality. Therefore, the navigation data is read and written, but not interpreted.

The present invention as defined above exploits this different usage. Accordingly, a method to copy a record carrier according to the present invention performs an access of the original record carrier comparable to a 'normal reading', i.e. a reading during normal access of the record carrier, so that a properly working copy of the original record carrier is obtained, in other words, the navigation data is considered/interpreted as set-out under 1) above.

According to the present invention, preferably the following measures are taken to exploit this different usage so that navigation data is set in a way that copy protection or reproduction obstruction of copies is achieved for streaming media, as e.g. defined in the MPEG standard ISO/IEC 13818-1, where the presentation stream is divided into regions called 'cells' and the navigation data is used to access the presentation stream and to allow user interaction in connection with the presentation stream.

A record carrier according to the present invention preferably comprises
at least one reproduction obstructing cell physically stored before or after a linked content cell, and/or
a physical storage arrangement of at least one of the at least one stream of linked content cells that is not in conformity with the linking order of these content cells, and/or
file system structures and/or file content used to locate the linked content cells on the record carrier that direct read-out devices that use data that are not explicitly stated in the standard of the record carrier to at least one reproduction obstruction data and/or cyclic data.

Such a reproduction obstruction cell might be physically stored directly before or after the linked content cell or also with a gap to the linked content cell as long as it is likely that a readout-device that performs a more linear access will access the reproduction obstruction cell.

Further, such file system structures and/or file content might be described in extensions or related standards to the standard used to produce the record carrier and needs not to direct the read-out devices to a reproduction obstruction cell, but might also alternatively direct the read-out devices to other reproduction obstruction mechanisms, arranged in arbitrary sectors or parts of the record carrier. An example is that a computer operating system might be designed to provide an access capability for many different file systems, whereas e.g. the DVD Specification for Read-Only Disc is like a second limiting modification of the UDF file system (version 1.02), i.e. comprises only a subset of file access possibilities. The present invention limits the proper access to devices that behave closely to the standard of the record carrier, in particular the DVD specification for Read-only Disc, but also similar existing or future standards, and devices that are accessing the record carrier according to other standards are rejected.

Correspondingly, a method according to the present invention preferably comprises the step(s) of:
physically storing at least one reproduction obstructing cell before or after a linked content cell, and/or
arranging a physical storage of at least one of the at least one stream of linked content cells that is not in conformity with the linking order of these content cells, and/or
modifying file system structures and/or file content used to locate the linked content cells on the record carrier so as to direct read-out devices that use data that are not explicitly stated in the standard of the record carrier to at least one reproduction obstruction data and/or cyclic data.

Further correspondingly a method to copy a record carrier according to the present invention preferably comprises the step(s) of:
determining all reproduction obstructing cells physically stored before or after a linked content cell and modifying or removing these cells so that reproduction of the copy of the record carrier is not obstructed thereby, and/or
determining of a linking order of the at least one stream of linked content cells and physically store the at least one stream of linked content cells so that a reproduction of the copy of the record carrier is not obstructed thereby, and/or
locate a root navigation file only using file system structures and/or file content related to the linked content cells as described in the in the standard of the record carrier.

In particular, as indicated above, devices that can properly access a record carrier according to the present invention locate a root navigation file using file system structures and/or file content related to the linked content cells as described in the used specification, in particular the DVD video specification. All other devices that are rejected, i.e. cannot properly access a record carrier according to the present invention are not reading navigation and presentation data based on a root navigation file, but on further file system structures and/or file content, which might also be related to the linked content cells, but which is additionally available on the record carrier.

According to the present invention, further preferably said linked content cells are linked and said at least one reproduction obstructing cell is physically arranged so that a reproduction device dedicated to said type of record carrier automatically gets navigated around said at least one reproduction obstructing cell during its access of the linked content cells stored on the record carrier, whereas the at least one reproduction obstructing cell gets accessed additionally to the accessed linked content cells when no such dedicated reproduction device is used for accessing the record carrier.

In this sense a reproduction device dedicated to said type of record carrier means a reproduction device that is designed for that type of record carrier, i.e. more or less fully allows to implements all the features enabled by the specific type of record carrier, such as a DVD player for a DVD as a record carrier. A not dedicated reproduction device that is used for accessing the record carrier might be a copy and/or rip device or software that might be designed for such record carriers, but rather for copying the format than for proper access of the specific record carrier.

According to the present invention, alternatively or additionally further preferably an access of said reproducing obstructing cells prohibits or disturbs a further reproduction or reduces an entertainment value of reproduced content that is originally stored within the content cells on the record carrier.

A reproduction obstruction cell according to the present invention might be a cell as referred to in the DVD standard, i.e. comparable to a content cell, but might also be another storage unit, e.g. a sector of the record carrier.

According to the present invention, further alternatively or additionally further preferably said reproducing obstructing cells comprise modifications that do not conform to the DVD Physical Specification, in particular infringe rules of EFM+ coding, and/or set wrong ECC data for PI and/or PO, and/or set wrong EDC, ID, CPR_MAI and/or IED data, and or add/set illegal UDF file system data, e.g. cyclic references.

Figure 4:
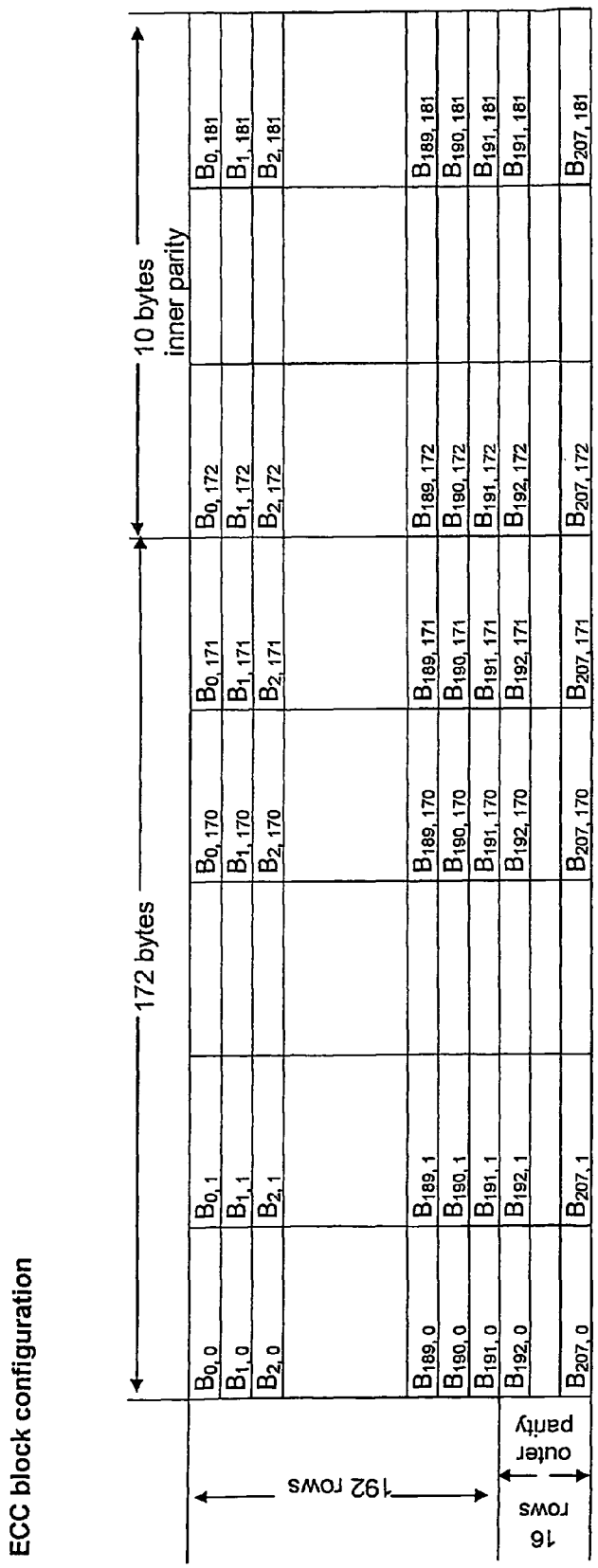

In this context and generally according to the DVD standard, the used abbreviations stand for:

ECC: error correction code. For the purpose of error correction 16 sectors are arranged in a matrix of 192 rows with 172 bytes each. In the first step the inner parity (PI) is calculated for every row of 172 bytes and appended as 10 bytes to the respective row of 172 bytes to complete the line of 182 bytes. In the second step the outer parity (PO) is calculated for every column including the bytes of the inner parity and appended as 16 lines of 182 bytes to the 192 lines of 182 bytes. FIG. 4 depicts the byte arrangement of the 16 sectors. The 10 bytes wide block on the right hand side is the inner parity. The last 16 lines on the bottom is the outer parity.

ID: identification data, which comprises a sector number and sector recording information.

IED: ID error detection code, which is used to find errors in the ID.

CPR_MAI: copyright management information.

EDC: error detection code for the main data, ID, IED and CPR_MAI.

Figure 5:
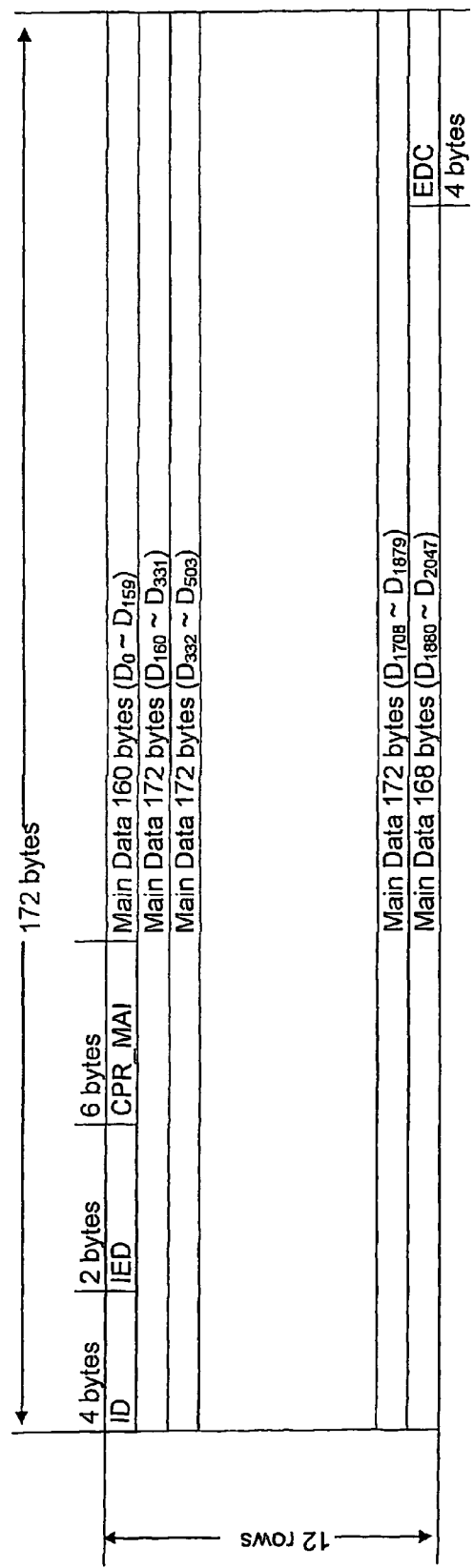

FIG. 5 shows the structure of one DVD sector that comprises 12 rows of 172 bytes, wherein the first row includes 4 bytes ID, 2 bytes IED, 6 bytes CPR_MAI, and 160 bytes main data in that order, the second to eleventh rows include 172 bytes main data, and the twelfth row includes 168 bytes main data and 4 bytes EDC in that order.

According to the present invention, still further alternatively or additionally further preferably said reproducing obstructing cells comprise data that does not conform to the used streaming media standard (e.g. MPEG standard), and/or that generate permutations of reproduced content stored within the content cells, and/or that adds content not related to the content stored within neighbouring content cells, e.g. advertising content, and/or that modifies reproduced audio and/or video content stored within the content cells so that it is experienced unpleasantly.

In this way, it is possible to create the impression that a working copy is produced by a copy/rip device or software, but the copy e.g. only reproduces scrambled content and/or content that additionally comprises advertisements so that the loss of profit made by the copying might be compensated by the additional profit generated through the advertisements.

Therefore, the present invention generally enables a business model for generating revenues also for copies of record carriers by including at least one advertisement that is generally not shown and also generally not accessible during the access of an original record carrier, since the navigation data, in particular the navigation data, navigates around these advertisements, but that is generally automatically included into at least one copied stream of linked content cells during the copy procedure, e.g. into the video stream and all corresponding audio streams. In this case the user of a copy is regarded to 'pay' the license fees for the copied content by being subjected to the at least one advertisement. In particular, this inclusion of the at least one advertisement works independently from the copying software or hardware as long as the above general access schemes are used, i.e. no special copy software or hardware must be installed that includes additional content into the copied record carrier that is not available on the original record carrier.

According to the present invention, still further alternatively or additionally preferably said at least one reproduction obstructing cell is a stream of linked reproduction obstructing cells that is interleaved with at least one stream of linked content cells, wherein each of the interleaved stream of linked cells provides one playback path and the playback path corresponding to the linked reproduction obstructing cells is not accessed by a reproduction device dedicated to said type of record carrier.

According to the present invention, still further alternatively or additionally preferably said navigation data comprises branch commands (e.g. link and jump commands) that are arranged in pre-commands and/or post-commands of program chains that comprise at least one program or in cell commands within programs, which are defined as a sequence of content cells.

All preferred features according to the present invention as defined above for the record carrier and the method to provide a copy protection for a record carrier according to the present invention as such or in an arbitrary combination are also applicable to the method to copy a record carrier according to the present invention and to the business method as set out above.

A computer program product according to the present invention comprises computer program means adapted to perform the method steps as set-out above when being executed on a computer, digital signal processor or the like.

A computer readable storage means according to the present invention stores thereon a computer program product as set-out above.

Figure 1:
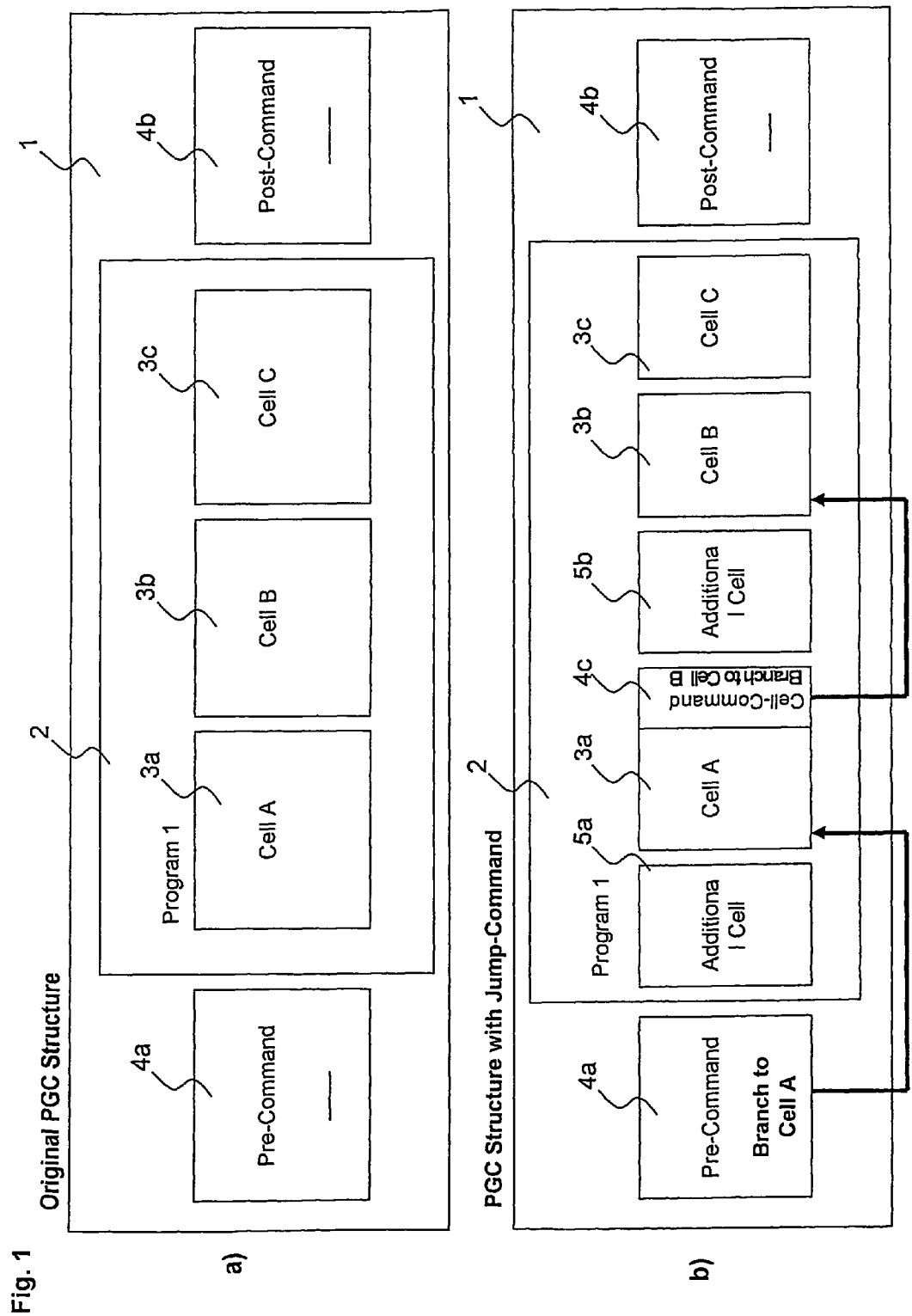
Figure 2:
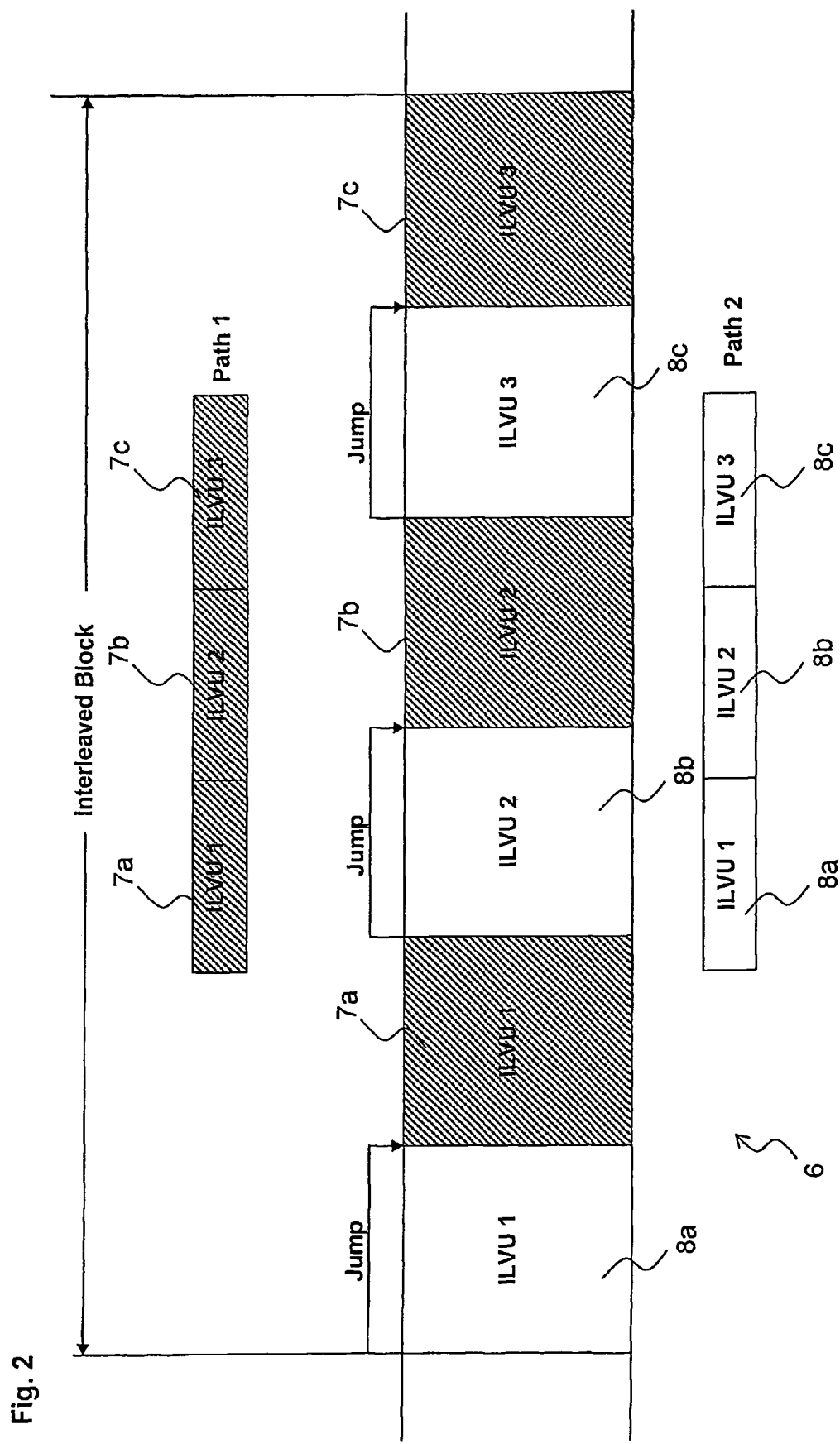

For a better understanding of the invention and to further elucidate the invention, its features, objects and advantages, exemplary preferred embodiments thereof are described in detail by way of example while making reference to the accompanying drawing, wherein:

FIG. 1 shows a possible application of a branch command to create a region that will not be reached during playback with a dedicated playback device, but usually will be reached during a more linear access, FIG. 2 depicts interleaved presentation data and methods of their access, FIG. 3 depicts methods of file system sector access, FIG. 4 shows the ECC block configuration, and FIG. 5 shows the data sector configuration.

The following description of an exemplary embodiment of this invention uses the DVD video specification as means to clarify the principles of the present invention. However, as also set out above, this invention is not restricted to this format. It can be applied for similar existing data formats or future data formats.

The relevant specification for DVD video media is the DVD Specifications for Read-Only Disc (despite its name, this specification also applies to DVD recordable media). This specification consists of three parts:

Part 1: Physical Specification
Part 2: File System Specification
Part 3: Video Specification The Physical Specification (Part 1) defines the mechanical and optical parameters of a disc (size, mass, reflectivity, . . . ) and the way data is recorded. Data is recorded in a single spiral track of small pits. The plane area between these pits is called land. The information area is subdivided into sectors, each of which represents a fixed amount of data.

The encoding process starts with sectors of 2048 bytes user data. During the encoding identification data and copyright management data is added to a user data sector. An error detection code (EDC) is calculated and is added to this enlarged sector. After this stage the sector is 2064 bytes large. In the next stage the sector is scrambled. After that an ECC block is formed of 16 subsequent scrambled sectors. An error correction code is calculated for the ECC block. In the last stage of the encoding process the sectors are encoded using the EFM+ modulation method.

The File System Specification (Part 2) defines the volume and file structure for DVD media. The format is called "UDF Bridge" and is based on the ISO/IEC 13346 standard. It shall conform to the OSTA Universal Disk Format (UDF) specification and the ISO 9660 standard.

The Video Specification (Part 3) defines the application of Part 1 and 2 for moving picture content. This part can be replaced by corresponding specifications for other applications, e.g. specifications for high definition audio discs.

The DVD specification refers to some other standards. In case of the video encoding the MPEG standard is referred. The MPEG standard defines the data format and the data compression method for the presentation data. Part 3 of the DVD specification additionally defines navigation data. The navigation data enables a lot of additional features, e.g.:

multiple audio tracks (e.g. different languages),
sub-titles,
different camera angles,
multistory seamless branching,
parental lock, and
menus.

As indicated above, many more additional features can be realized using the navigation data, in particular also the copy protection scheme according to the present invention.

As generally set out above, the present invention exploits the difference in the data access and usage. In particular the following data access and usage schemes for DVD are identified:

type a) during the playback of DVD video content at common DVD video playback devices, e.g. consumer electronic player or DVD player software, and
type b) during ripping, i.e. transferring content on computer hard disc drives, in the following also referred to as copying, or copying content onto a recordable record carrier with rip/copy software.

Type a) is characterized by the use of navigation data in a way it is intended by the DVD video specification, even if this is not true for every detail. Type b) is characterized by ignoring large parts of the navigation data.

According to the described exemplary preferred embodiment of the present invention the difference between data usage of type a) and type b) is used to make rip/copy of DVD video content difficult or impossible, and/or
to reduce the entertainment value of the copied content.

One way to make the rip/copy of DVD video content difficult or impossible is to modify one or more DVD sectors so that the sectors do not conform to the Physical Specification (Part1). This can be done by intentionally infringe the rules of EFM+ coding, and/or
intentionally set wrong ECC data (PI, PO), and/or
intentionally set wrong EDC, ID, CPR_MAI or IED data, and/or
intentionally add/set illegal UDF file system data, e.g. cyclic references.

Ways to reduce the entertainment value of DVD video content are intentionally set data that does not conform to MPEG standard, and/or
permute parts of the video content, and/or
add additional video content, e.g. advertising content, and/or
modify audio and/or video content so that it is experienced unpleasantly.

The exemplary preferred embodiment of the present invention avoids diminutions during playback of type a) by navigation data. Navigation data is used to leave out the modified sectors and the video content with reduced entertainment value.

There are several methods that can be used to leave-out modified regions during playback of type a). These regions, one of which might be enough to copy protect a record carrier, are also referred to as bypassed regions.

One example for this method is the use of navigation commands, which build a part of the navigation data. In particular Branch commands can be used to leave-out parts of the video content.

FIG. 1 shows a possible application of a Branch command to create a region that will not be reached during playback of type a), but usually will be reached during access of type b), i.e. to create a so-called bypassed region.

The DVD Video Specification defines the concept of program chains 1, programs 2 and cells 3. A cell 3 is the smallest addressable unit of a video object stream. A program 2 is a sequence of cells 3 and is usually used to form a chapter of a movie. A program chain 1 is a collection of programs 2. In the example shown in FIG. 1a) the program chain 1 comprises a first program 2 that comprises first to third cells 3a, 3b, 3c. Within a program chain 1, a sequence of navigation commands 4 can be added to begin and end of a program 2 and within a program 2. These navigation commands 4 are called Pre-Commands 4a, Post-Commands 4b and Cell-Commands 4c.

To create regions in a program chain 1 or program 2 that are left-out during playback of type a), i.e. bypassed regions, a first additional cell 5a might be inserted before the first cell 3a and a second additional cell 5b might be inserted before the second cell 3b, and a first branch command might be set into the pre-command 4a and a second branch command might be set into the cell-command 4c, as shown in FIG. 1b). The target address of the first branch commands is set to the first cell 3a of the original program 2 and the target address of the second branch commands is set to the second cell 3b of the original program 2. The pre-command 4a causes the player to start the playback of the program 2 at the first cell 3a and to not access the additional cell 5a. The cell-command 4c causes the player to continue the playback after the first cell 3a of the program 2 at the second cell 3b and to not access the additional cell 5b.

On the other hand, the additional (reproduction obstruction) cells 5a, 5b are physically inserted before the first cell 3a and the second cell 3b, respectively. Therefore, it can be used to make rip/copy difficult or impossible or it can be used to reduce the entertainment value of the content, since copy/rip software generally does not use the navigation data and performs a linear access of the cells of the program 2, i.e. in the shown example of the first additional cell 5a, the first cell 3a, the second additional cell 5b, the second cell 3b, and the third cell 3c, in this order. Such a linear access leads to a corresponding copy and reproduction thereof.

Also the program chains 1 are accessed in a linear manner by copy/rip software. Therefore, it is also possible to reduce the entertainment value of a copy by physically arranging the program chains 1 of an original in an order not in conformity with the intended playback order and using post-commands 4b in a way that the intended playback order is secured. The program chains 1 are then copied and also reproduced from the copy in the order as physically stored on the original.

Such a non-linear storage with the same effect is also possible for programs 2 and/or cells 3. In this case just other relative addressing mechanisms than the pre-commands or post-commands or cell-commands are used.

The use of navigation commands is only one option to create a bypassed region. A second option is the use of interleaved structures as defined in the DVD Video Specification. The target of these interleaved structures is to enable parallel playback paths and the possibility to change seamlessly between the playback paths. Interleaved structures are e.g. used for language credits,
parental levels, and
multi-angles.

FIG. 2 depicts interleaved presentation data. An interleaved block 6 is a region in the presentation data with parallel playback paths 7, 8. An interleaved block consists of a sequence of interleaved units (ILVU), here respectively of first to third ILVUs 7a, 7b, 7c, of the first playback path 7 and first to third ILVUs 8a, 8b, 8c of the second playback path 8. Every ILVU 7a, 7b, 7c, 8a, 8b, 8c is part of a playback path 7, 8. The ILVUs 7a, 7b, 7c, 8a, 8b, 8c of the playback paths 7, 8 are mixed together in alternating sequence, i.e. in an order first ILVU 8a of second playback path, first ILVU 7a of first playback path, second ILVU 8b of second playback path, second ILVU 7b of first playback path, and third ILVU 8c of second playback path, third ILVU 7c of first playback path. Interleaved blocks 6 can be used in a way that they are not visible to the user. Hence an additional playback path can be used as bypassed region, i.e. not selectable by the user during dedicated access, but viewable and not distinguishable for copy/rip software or hardware.

A third example to create a bypassed region is to exploit the fact that DVD video navigation data references data by relative sector addresses. A playback device of type a) has to read the root navigation data file. The remaining presentation and navigation data can be read by directly reading the referenced sectors.

During Playback of type b) in many cases more sectors are read and/or the file system data can be modified in a way that additional sectors are read.

FIG. 3 depicts a possible application of this concept. During access of a playback device of type a) sectors are read in a specific sequence. In particular, after a record carrier gets inserted into a drive for accessing the record carrier, initially the lead-in area 9 gets accessed, before in a first step S1 a jump to the volume description 10 is performed to read the volume description 10. Then, in a following second step S2 a jump to the partition description 11 is performed to read the partition description 11. Thereafter, in a following third step S3 a jump to the root directory 12 is performed to access the root directory 12. Following the access of the root directory 12, in a fourth step S4 a jump to the directory 13 is performed to access the directory 13. The access of the directory 13 then enables a relative jump to a file 14 in a fifth step S5 and then the access thereof. All following file accesses are also performed in a relative manner dependent on information already available, i.e. available from the current or earlier file or directory accesses.

Data access of type b) in some cases reads additional sectors and/or can be forced to read additional sectors. These additional sectors constitute a bypassed region for the normal type a) access. In the shown example, the first to fifth jumps S1 to S5 with the respective following accesses are also performed during the type b) access. However, the access of the directory 13 indicates to the copy mechanism to additionally access a further file 15, since the copy mechanism would otherwise produce an incomplete copy. Therefore, the copy mechanism performs a sixth jump S6 after the fifth jump S5 to the further file 15 to enable the access thereof.

Data structures that can be used to force the read of additional sectors are and/or provoke cyclic reading:
ISO 9660 data, Joliet data
extended UDF data
UDF volume/partition data (i.e. more than one volume and/or more than one partition)
virtual address table
sparing management data
presentation data used by specific reading devices e.g.
Microsoft operating systems
hidden files
icon resources in COFF format executable files
disc logos
autorun.inf files Mac OS
resource forks A fourth example to create a bypassed region is to exploit the arrangement of the file system data, i.e. use the linking of the file system data. Bypassed regions, which are e.g. arranged between lead-in 9 and volume description 10, between volume description 10 and partition description 11, between partition description 11 and root directory 12, between root directory 12 and directory 13, and/or between directory 13 and the first file 14, are preferably regions that comprise one or more sectors that lead to an abortion of the access of the record carrier, when the one or more sectors are accessed. Such a bypassed region prevents the copying of a disc with a copy software and/or hardware that searches the presentation data in a sequential manner from the beginning of the disc, i.e. read all sectors of the disc in a consecutive manner until a particular marker, e.g. for the beginning of a video stream, is found, e.g. to overcome the third example to create a bypassed region that is elucidated above. FIG. 3 shows a bad sector 16 arranged between volume description 10 and partition description 11 as an example for bypassed region of this type.

The invention claimed is:

1. A non-transitory storage medium having stored thereon data representing a stream of cells, the cells being addressable units of the stream, the stream comprising content cells and navigation data, the content cells being linked in accordance with the navigation data, at least one of the cells of the stream being a reproduction obstructing cell physically stored before or after a linked content cell, said at least one reproduction obstructing cell forming part of said cells of the stream, wherein the content cells, at least one of said navigation data, and the at least one reproduction obstructing cell are arranged such that accessing the data on the storage medium in a copy mode, in which the content cells, the navigation data, and the at least one reproduction obstructing cell are to be copied from the storage medium onto a recordable record carrier and the content cells are not accessed according to said navigation data, provides disturbed data access of reduced quality, whereas accessing the data on the storage medium in a reproduction mode, in which the content cells are accessed according to said navigation data, provides undisturbed access, wherein said at least one reproduction obstructing cell is arranged such that access in said reproduction mode includes navigating around said at least one reproduction obstructing cell when linked content cells are accessed, whereas access in said copy mode includes accessing linked content cells in addition to said at least one reproduction obstructing cell.

2. The non-transitory storage medium according to claim 1, wherein the copy mode is a generally linear access mode.

3. The non-transitory storage medium according to claim 1, wherein an access of said at least one reproduction obstructing cell prohibits or disturbs a further reproduction or reduces an entertainment value of reproduced content that is originally stored within the content cells on the storage medium.

4. The non-transitory storage medium according to claim 3, wherein said at least one reproduction obstructing cell includes data having an effect that data stored on the storage medium does not conform with the DVD physical specification by at least one of the group comprising:
setting incorrect ECC data for at least one of PI and PO;
setting at least one of incorrect EDC, ID, CPR_MAI and IED data;
addition of illegal UDF file system data; and
setting of illegal UDF file system data.

5. The non-transitory storage medium according to claim 1, wherein said at least one reproduction obstructing cell includes
data that adds advertising content stored within neighboring content cells.

6. The non-transitory storage medium according to claim 1, wherein said at least one reproduction obstructing cell is a stream of linked reproduction obstructing cells that is interleaved with at least one stream of content cells, wherein each of the stream linked cells provides one playback path, and the playback path corresponding to the linked reproduction obstructing cell is not followed by a reproduction device accessing the storage medium in accordance with said reproduction mode.

7. The non-transitory storage medium according to claim 1, wherein said navigation data includes branch commands that are arranged in at least one of pre-commands and post-commands of program chains that include at least one program or in cell commands within programs, which are defined as a sequence of content cells.

8. A method to provide copy protection of a non-transitory storage medium having stored thereon data representing a stream of cells, the method comprising:
preparing the stream of cells, the cells being addressable units of the stream, the stream comprising content cells and navigation data;
linking the content cells in accordance with the navigation data;
inserting at least one reproduction obstructing cell before or after a linked content cell, said at least one reproduction obstructing cell forming part of said cells of the stream, wherein the content cells and at least one of said navigation data are arranged such that accessing the data on the storage medium in a copy mode, in which the data are to be copied from the storage medium onto a recordable record carrier and the content cells are not accessed in accordance with the navigation data, provides disturbed data access of reduced quality, whereas accessing the data on the storage medium in a reproduction mode, in which the content cells are accessed in accordance with the navigation data, provides undisturbed access,
wherein said at least one reproduction obstructing cell is arranged such that access in said reproduction mode includes navigating around said at least one reproduction obstructing cell when linked content cells are accessed, whereas access in said copy mode includes accessing linked content cells in addition to said at least one reproduction obstructing cell.

9. The method according to claim 8, wherein the copy mode is a generally linear access mode.

10. The method according to claim 8, further comprising:
selecting a content of said at least one reproduction obstruction cell so that an access of said at least one reproducing obstruction cell prohibits or disturbs a further reproduction or reduces an entertainment value of reproduced content that is originally stored within the content cells on the storage medium.

11. The method according to claim 8,
wherein said of least one reproduction obstructing cell has an effect that data stored on the storage medium does not conform with the DVD physical specification by at least one of the group comprising:
setting incorrect ECC data for at least one of PI and PO;
setting at least one of incorrect EDC, ID, CPR_MAI and IED data;
addition of illegal UDF file system data; and
setting of illegal UDF file system data.

12. The method according to claim 8,
wherein said at least one reproduction obstructing cell includes
data that adds advertising content stored within neighboring content cells.

13. The method according to claim 8, further comprising:
using navigation data to provide the linking of said linked content cells, in particular branch commands that are arranged in at least one of pre-commands and post-commands of program chains that include at least one program or in cell commands within programs, which are defined as a sequence of content cells.

14. The method according to claim 8, further comprising:
interleaving said at least one reproduction obstructing cell, which constitutes a stream of linked reproduction obstructing cells, with at least one stream of content cells, wherein each of the stream of linked cells provides one playback path, and the playback path corresponding to the linked reproduction obstructing cell is not followed by a reproduction device accessing the data carrier in accordance with said reproduction mode.

15. A method for producing at least one copy of at least a portion of data stored on a first non-transitory storage medium, the first storage medium having stored thereon data representing a stream of cells, the cells being addressable units of the stream, the stream comprising content cells and navigation data, the method comprising:
linking the content cells in accordance with the navigation data, wherein to produce the at least one copy, data representing the stream of cells is accessed in accordance with the navigation data, and wherein said accessed data is transferred as a copy to a second non-transitory storage medium; and
determining all reproduction obstructing cells physically stored before or after a linked content cell, and modifying or removing the determined reproduction obstructing cells such that the copy of the storage medium is not obstructed.

16. A non-transitory computer readable medium storing a program that when executed on a computer or digital signal processor, causes the computer or the digital signal processor to perform the method steps as defined in claim 8.

17. The method of claim 9, further comprising:
providing standard type file system structures and file content and non-standard type file system structures and file content used to locate the linked content cells on the storage medium, respectively, wherein said non-standard type file system structures and file content routes a read out device to reproduction obstruction data and cyclic data.

18. The method of claim 15, further comprising:
determining of a linking order of the at least one stream of linked content cells and physically storing the at least one stream of linked content cells such that a reproduction of the copy of the first storage medium is not obstructed.

19. The method of claim 15, further comprising:
locating a root navigation file only using at least one of file system structures and file content related to the linked content cells as described in the standard of the first storage medium.

20. A non-transitory storage medium having stored thereon data representing a stream of cells, the cells being addressable units of the stream, the stream comprising content cells and navigation data, the content cells being linked in accordance with the navigation data, wherein the content cells and at least one of said navigation data are arranged such that accessing the data on the data carrier in a copy mode, in which the data are to be copied from the storage medium onto a recordable record carrier and the content cells are not copied in accordance with said navigation data, provides disturbed data access of reduced quality, whereas accessing the data on the data carrier in a reproduction mode, in which the content cells are accessed in accordance with said navigation data, provides undisturbed access.

21. The non-transitory storage medium according to claim 20, further comprising:
first file system data structures and file content conforming to a storage medium standard and second file system data structures and file content not conforming to the storage medium standard, wherein the second file system data structures and file content route said copy mode to reproduction obstruction data or cyclic data, and wherein said reproduction mode will navigate around said reproduction obstruction data or cyclic data.

22. A method to provide copy protection of a non-transitory storage medium having stored thereon data representing a stream of cells, the cells being addressable units of the stream, the stream comprising content cells and navigation data, the method comprising:
linking the content cells in accordance with the navigation data, wherein the content cells and at least one of said navigation data are arranged such that accessing the data on the storage medium in a copy mode, in which the data are to be copied from the storage medium onto a recordable carrier and the content cells are not copied in accordance with said navigation data, provides disturbed data access of reduced quality, whereas accessing the data on the storage medium in a reproduction mode, in which the content cells are accessed in accordance with said navigation data, provides undisturbed access.

23. The method to provide copy protection of a non-transitory storage medium according to claim 22, the method further comprising:
storing first file system data structures and file content conforming to a storage medium standard and second file system data structures and file content not conforming to the storage medium standard, wherein the second file system data structures and file content route said copy mode to reproduction obstruction data or cyclic data, and wherein said reproduction mode will navigate around said reproduction obstruction data or cyclic data.

24. The non-transitory storage medium according to claim 20, further comprising:
a physical storage arrangement of at least one content cell of the at least one stream of linked content cells that is not in conformity with the linking order of the content cells such that said copy mode will access said at least one stream of linked content cells in an order as physically stored, and said reproduction mode will access said at least one stream of linked content cells in an order conforming to the linking order of the content cells.

25. The non-transitory storage medium according to claim 20, wherein a number of content cells that is accessed in the copy mode is greater than or equal to a number of content cells that is accessed according to the reproduction mode.

26. The non-transitory storage medium according to claim 20, wherein the navigation data is stored in a route navigation file that is stored on the storage medium.

27. The non-transitory storage medium according to claim 20, wherein the navigation data is configured to be used to allow user interaction.

28. The non-transitory storage medium according to claim 20, further comprising:
a physical storage arrangement of at least one content cell of the at least one stream of linked content cells that is not in conformity with the linking order of the content cells such that said copy mode will access said at least one stream of linked content cells in an order as physically stored, and said reproduction mode will access said at least one stream of linked content cells in an order conforming to the linking order of the content cells.

29. The method to provide copy protection of a non-transitory storage medium according to claim 22, wherein a number of content cells that is accessed in the copy mode is greater or equal to a number of content cells that is accessed according to the reproduction mode.

30. The method to provide copy protection of a non-transitory storage medium according to claim 22, wherein the navigation data is stored in a route navigation file that is stored on the storage medium.

31. The method to provide copy protection of a non-transitory storage medium according to claim 22, wherein the navigation data is configured to be used to allow user interaction.

32. The non-transitory storage medium according to claim 1, wherein said at least one reproduction obstructing cell comprises data that does not conform to a used streaming media standard appropriate to the storage medium.

33. The non-transitory storage medium according to claim 1, wherein the at least one reproduction obstructing cell comprises data that is configured to generate permutations of reproduced content stored within the content cells.

34. The non-transitory storage medium according to claim 1, wherein the at least one reproduction obstructing cell comprises data that is configured to add content that is not related to the content stored in neighboring content cells.

35. The non-transitory storage medium according to claim 1, wherein the at least one reproduction obstructing cell is configured to modify reproduced audio and/or video content stored in the content cells.

36. The method according to claim 8, wherein the content cells are reproduced from the copy in the order as physically stored on the storage medium.

37. The method according to claim 8, wherein said at least one reproduction obstructing cell includes data that does not conform to a streaming media standard appropriate to the storage medium.

38. The method according to claim 8, wherein said at least one reproduction obstructing cell includes data that generates permutations of reproduced content in the content cells.

39. The method according to claim 8, wherein the at least one reproduction obstructing cell includes data that adds content unrelated to the content stored in neighboring content cells.

40. The non-transitory storage medium according to claim 1, wherein said at least one reproduction obstructing cell includes data having an effect that data stored on the storage medium does not conform with the DVD physical specification by infringing rules of EFM+ coding.

41. The method according to claim 8, wherein said at least one reproduction obstructing cell has an effect that data stored on the storage medium does not conform with the DVD physical specification by infringing rules of EFM+ coding.

* * * * *